(12) United States Patent
Wereski

(10) Patent No.: US 10,358,072 B2
(45) Date of Patent: Jul. 23, 2019

(54) TAILGATE RETRACTABLE PLATFORM APPARATUS

(71) Applicant: CJ Wereski, Elma, NY (US)

(72) Inventor: CJ Wereski, Elma, NY (US)

( * ) Notice: Subject to any disclaimer, the term of this patent is extended or adjusted under 35 U.S.C. 154(b) by 0 days.

(21) Appl. No.: 15/491,516

(22) Filed: Apr. 19, 2017

(65) Prior Publication Data

US 2017/0297468 A1  Oct. 19, 2017

Related U.S. Application Data

(60) Provisional application No. 62/324,576, filed on Apr. 19, 2016.

(51) Int. Cl.
*B60N 3/00* (2006.01)
*B62D 33/03* (2006.01)
*B62D 33/027* (2006.01)

(52) U.S. Cl.
CPC ......... *B60N 3/001* (2013.01); *B62D 33/0273* (2013.01); *B62D 33/03* (2013.01)

(58) Field of Classification Search
CPC ..... B62D 33/0273; B62D 33/03; B60N 3/001
See application file for complete search history.

(56) References Cited

U.S. PATENT DOCUMENTS

| | | |
|---|---|---|
| 3,437,058 A | 4/1969 | Bue |
| 5,136,953 A | 8/1992 | Schmidt |
| 5,575,521 A * | 11/1996 | Speis ................. B62D 33/0273 108/44 |
| 5,857,741 A | 1/1999 | Anderson |
| 6,045,172 A | 4/2000 | Thomas et al. |
| 6,192,808 B1 | 2/2001 | Bue |
| 6,364,391 B1 | 4/2002 | Everett |
| 6,739,269 B1 | 5/2004 | Benton |
| 8,123,271 B1 * | 2/2012 | Wimberley .......... B60N 2/3095 296/57.1 |

* cited by examiner

*Primary Examiner* — D Glenn Dayoan
*Assistant Examiner* — Melissa A Black
(74) *Attorney, Agent, or Firm* — Vincent G. LoTempio; Kloss, Stenger & LoTempio; David T. Stephenson

(57) ABSTRACT

A retractable tailgate table provides a folding table structure that is operable from the tailgate of a vehicle, so as to expand the functionality of the vehicle by providing a supportive and adjustable table that can be retracted for stowage or folded out from the tailgate for operational usage from the tailgate. The table comprises a mounting plate that fixedly mounts to the tailgate. The mounting plate may include a channel that enables a strap to wrap around the tailgate and through the channel for detachable attachment. A hinged arm hingedly articulates from the tailgate to move the table between a stowed position and an operational position. A platform pivotally joins the hinged arm, providing a supportive surface therefrom. The platform pivots to a desired slope and slides to and from the tailgate. A stabilizer bar extends from the platform to the ground surface to provide vertical and lateral stability.

18 Claims, 6 Drawing Sheets

TAILGATE RETRACTABLE PLATFORM APPARATUS

CROSS REFERENCE OF RELATED APPLICATIONS

This application claims the benefits of U.S. provisional application No. 62/324,576, filed Apr. 19, 2016 and entitled RETRACTABLE TAILGATE TABLE, which provisional application is incorporated by reference herein in its entirety.

FIELD OF THE INVENTION

The present invention relates generally to a tailgate retractable platform apparatus that operates from the tailgate of a vehicle. More so, the tailgate retractable platform apparatus is configured to operate on an open tail gate of a pick-up truck or other vehicle that has a hinged gate; whereby the tailgate retractable platform apparatus includes a mounting plate that mounts the tailgate; whereby a hinged arm extends from the mounting plate and articulates between a stowed position that is coplanar with the tailgate, and an operational position that is extended from the tailgate; whereby a platform on one end of the hinged arm: provides a supportive surface in the operational position, pivots in accordance with the movement of the hinged arm, and slides laterally

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a tailgate, or sometimes the hatch, is a hinged board or door at the rear of a vehicle that can be moved up or down during loading and unloading. Also called a tailboard, it is commonly found in pickup trucks or hatchback vehicles. A truck tailgate panel often consists of an inner and outer glass fiber composite panel bonded together, along with a toughened and heated window glass attached to the outer surface. A striker pin at each rear corner of the truck tailgate engages with a spring loaded latch plate on the body, with a single release cable operating both latches and terminating in release handle on the driver's side of the cabin rear bulkhead.

Typically, a pickup truck with an open bed is a useful motor vehicle for its passenger and cargo carrying capabilities. While pickup trucks can be selected with different sized cargo areas, there is always time that a cargo piece of extra length must be carried which may be too long for the truck even with the tailgate in a down position. Pickup trucks have also been widely used as transportation to sporting events and for tailgate parties that the driver may attend at the event. For the tailgate party, it may be desirable to have more tabletop space than that could be provided by the tailgate itself. Also, for general eating, writing, and resting capabilities, a raised platform on the tailgate may be a useful accessory for such vehicles.

Other proposals have involved accessories that enhance the tailgate capacities of pickups. The problem with these accessories is that they do not hingedly articulate directly from the tailgate of the pickup. Also, these accessories do not provide a stabilizer bar and lateral extensions to increase structural integrity and surface area of the platform. Even though the above cited accessories that enhance the tailgate capacities of pickups meet some of the needs of the market, a hose gripping apparatus that wraps around a retractable tailgate table provides a folding table structure that is operable from the tailgate of a vehicle, so as to expand the functionality of the vehicle by providing a supportive and adjustable table that can be retracted for stowage or folded out from the tailgate for operational usage from the tailgate is still desired.

SUMMARY

Illustrative embodiments of the disclosure are generally directed to a tailgate retractable platform apparatus. The tailgate retractable platform apparatus serves to provide a platform at the tailgate of a vehicle that can support myriad functions and can be easily retracted and extended with minimal force, skills, and tools. The tailgate retractable platform apparatus provides a folding table structure that is operable from a tailgate of a vehicle. Tailgate retractable platform apparatus serves to expand the functionality of vehicle by providing a supportive and adjustable support structure that can be folded in for stowage on the tailgate, or hingedly expanded out from the tailgate for operational usage directly from the tailgate. A user may sit on tailgate while working, eating, or writing on tailgate retractable platform apparatus. Though in other embodiments, a user may also sit directly on the platform apparatus.

In one embodiment, tailgate retractable platform apparatus comprises a mounting plate that mounts to the tailgate, a hinged arm that hingedly articulates from the tailgate, and a panel that pivotally joins the hinged arm and provides a supportive surface therefrom. A stabilizer bar extends from an underside surface of the panel to provide additional stability. In one embodiment, stabilizer bar may telescopically extend and retract.

Vehicle may include, without limitation, a pick-up truck, a van, a boat, an aircraft, and any vehicle having a hinged tailgate or extended and retractable panel. Tailgate may include a panel that hingedly pivots between a closed position and an extended open position from a rear section of the vehicle, i.e., a bed of a pick-up truck. The tailgate may also laterally extend and retract from a compartment in the vehicle. Tailgate also comprises a top surface on which the tailgate retractable platform apparatus operates.

In one aspect of the present invention, a tailgate retractable platform apparatus comprises:

a mounting plate defined by a generally flat shape, the mounting plate disposed in a generally coplanar disposition to the tailgate, the mounting plate configured to enable mounting to a tailgate;

a hinged arm, the hinged arm comprising a mount end, a panel end, and a middle region having at least one hinge, the mount end configured to pivotally join with the mounting plate, the at least one hinge configured to enable hinged articulation of the hinged arm between a stowed position and an operational position, whereby the hinged arm folds at the at least one hinge, such that the mount end engages the panel end in the stowed position, whereby the hinged arm at least partially extends about the at least one hinge to the operational position; and a panel, the panel defined by an upper surface and a lower surface, the lower surface of the panel configured to pivotally join with the panel end of the hinged arm, whereby the panel engages the mounting plate in a coplanar disposition in the stowed position, whereby the panel is fixedly disposed at a slope relative to the hinged arm in the operational position.

In a second aspect, the platform apparatus further comprises a stabilizer bar that supports at least one lateral extension.

In another aspect, the mounting plate comprises a channel.

In another aspect, the channel is configured to receive a strap, the strap configured to wrap around the tailgate and through the channel.

In another aspect, the at least one hinge comprises a barrel hinge.

In another aspect, the at least one hinge comprises a hinge hole and an axle.

In another aspect, the panel is generally flat and rigid.

In another aspect, the stabilizer bar is detachable from the panel.

In another aspect, the panel comprises at least one extension configured to increase the surface area of the panel.

One objective of the present invention is to provide a working, eating, or sitting surface on the tailgate of a vehicle.

Another objective is to provide a mounting plate that can fixedly or detachably attach to the tailgate.

Another objective is to enable a user to sit on the tailgate and use the upper surface of the panel as a table, a seat, and a working surface.

Another objective is to enable a user to pivot the panel to a desired slope relative to the hinged arm, and then lock the panel at the slope.

Another objective is to enable a user to slide the panel towards and away from the user who is sitting on the tailgate.

Another objective is to enable the tailgate retractable platform apparatus to compact to the stowed position, whether the tailgate is open or closed.

Another objective is to minimize interference with the tailgate when the tailgate retractable platform apparatus is in the stowed position.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A tailgate retractable platform apparatus 200 is referenced in FIGS. 1-13. The tailgate retractable platform apparatus 200, hereafter "apparatus 200" provides a folding table structure that is operable from a tailgate 104 of a vehicle 100. Apparatus 200 serves to expand the functionality of vehicle 100 by providing a supportive and adjustable support structure that can be folded in for stowage on the tailgate, or hingedly expanded out from the tailgate 104 for operational usage directly from the tailgate 104. A user may sit on tailgate 104 while working, eating, or writing on apparatus 200. Though in other embodiments, a user may also sit directly on the apparatus 200.

Figure 1:
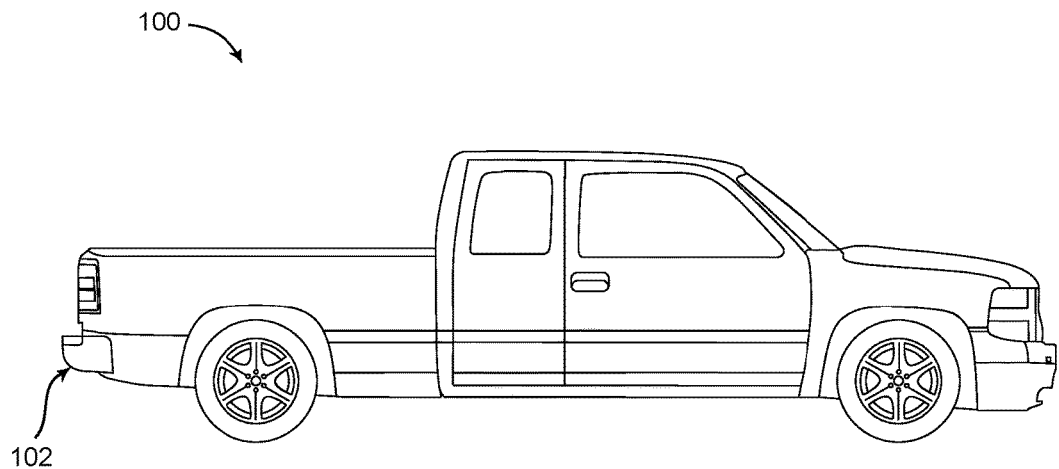
FIG. 1 illustrates a perspective view of an exemplary vehicle, in accordance with an embodiment of the present invention.
Figure 2:
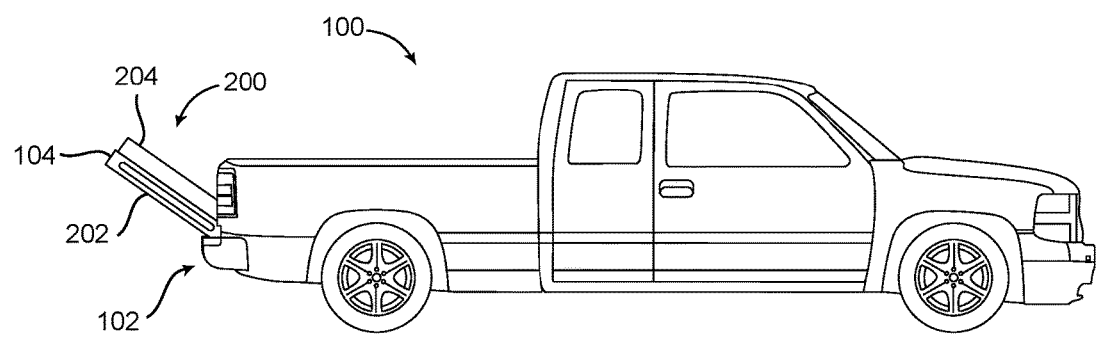
FIG. 2 illustrates a perspective view of a vehicle with a tailgate opening, in accordance with an embodiment of the present invention.

As FIG. 1 references, vehicle 100 may include, without limitation, a pick-up truck, a van, a boat, an aircraft, and any vehicle having a hinged tailgate or extended and retractable panel. A panel 204 hingedly pivots between a closed position and an extended open position relative to tailgate 104 from a rear section 102 of the vehicle 100, i.e., a bed of a pick-up truck. Tailgate 104 may also laterally extend and retract from a compartment in the vehicle 100 (FIG. 2). Tailgate 104 also comprises a top surface 106 on which apparatus 200 operates.

Figure 3:
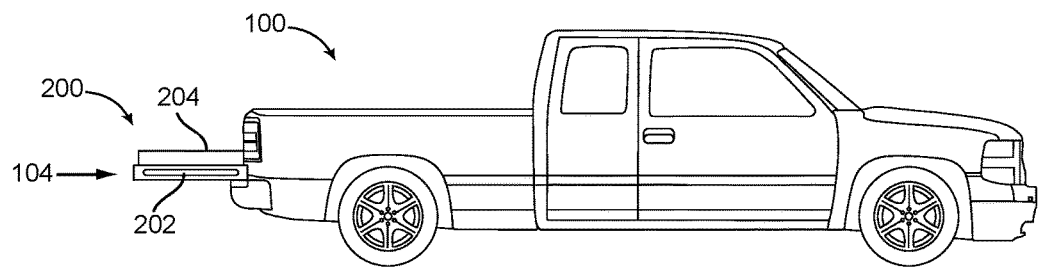
FIG. 3 illustrates a perspective view of a vehicle with a tailgate in an open position and a retractable tailgate table in a stowed position, in accordance with an embodiment of the present invention.

As referenced in FIG. 3, apparatus 200 comprises a mounting plate 202 that joins with a top surface 106 of the tailgate 104. Mounting plate 202 rests in a generally coplanar disposition with tailgate 104. Mounting plate 202 remains coplanar and attached to the tailgate 104, whether tailgate 104 is in the horizontal open position, or the vertical closed position.

Figures 10, 11, 12:
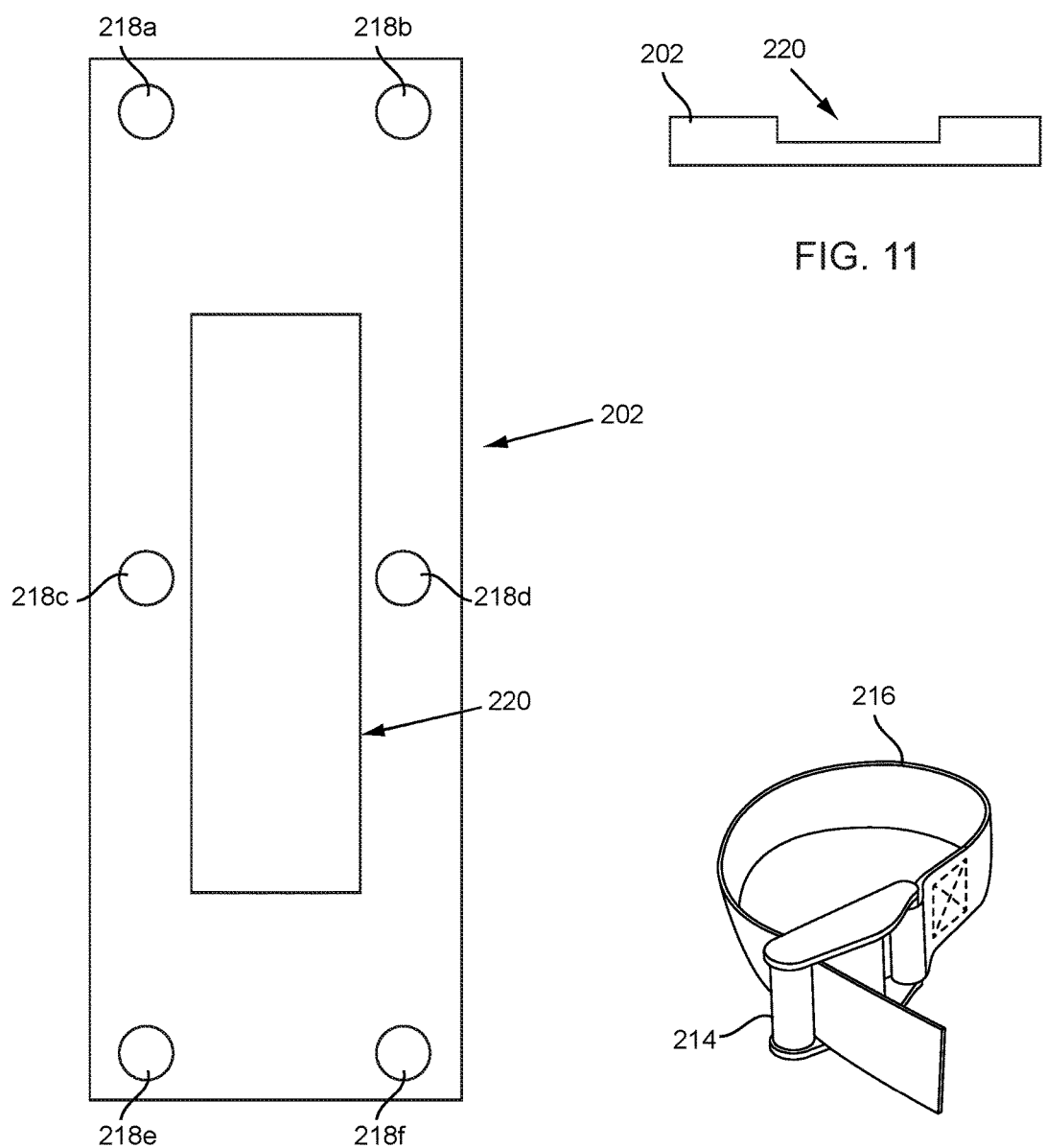
FIG. 10 shows top view of mounting panel having a channel, in accordance with an embodiment of the present invention.
FIG. 11 illustrate close up views of a mounting plate with a channel for detachable mounting to the tailgate, in accordance with an embodiment of the present invention.
FIG. 12 illustrates a close-up view of a strap, in accordance with an embodiment of the present invention.

In some embodiments, mounting plate 202 may be fixedly joined to the top surface 106 of the tailgate 104. In this configuration, at least one fastening hole 218a, 218b, 218c, 218d, 218e, 218f enables passage of a fastener that fastens to the top surface 106 of the tailgate 104. The fastener may include a screw that passes through any of six fastening hole 218-f (FIG. 10). However in other embodiments, the mounting plate 202 detachably attaches to the tailgate 104 through a channel 220 that enables a strap 216 to adjustably fasten mounting plate 202 to the top surface 106 of tailgate 104.

Figure 4:
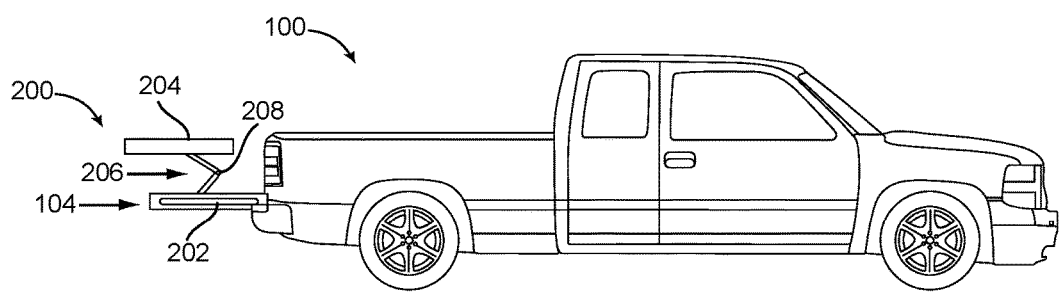
FIG. 4 illustrates a perspective view of a vehicle with a tailgate in an open position and a retractable tailgate table having a hinged arm extending towards an operational position, in accordance with an embodiment of the present invention.

As FIG. 4 shows, Apparatus 200 may further include a hinged arm 206 defined by a mount end 226 and a panel end 228. At least one hinge 208 approximately at a middle region 230 of the hinged arm 206. Hinge enables hinged articulation of the hinged arm 206. In one embodiment, hinge 208 is comprised of a hinge hole and an axle, whereby the axle rotates in the hinge hole. Though any hinged mechanism known in the art may also be used.

Figure 5:
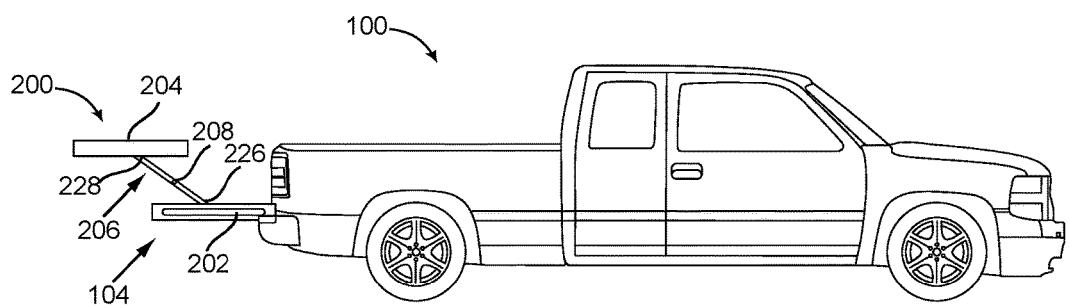
FIG. 5 illustrates a perspective view of a vehicle with a tailgate in an open position and a retractable tailgate table in an operational position, in accordance with an embodiment of the present invention.

Hinged arm 206 is configured to hingedly articulate about hinge 208; between a collapsed stowed position that is coplanar with tailgate 104, and an extended operational position that extends out and approximately perpendicular to the tailgate 104 (FIG. 5). Generally, the operational position occurs when tailgate 104 is open, and the stowed position occurs when tailgate 104 is closed. Though hinged arm 206 may articulate independently of the positioning of tailgate 104.

Figure 7:
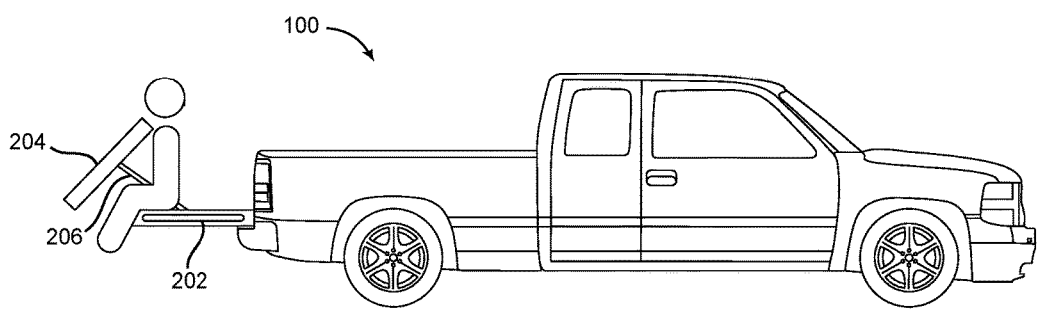
FIG. 7 illustrates a perspective view of a user sitting on a tailgate and pivoting a platform for use, in accordance with an embodiment of the present invention.
Figure 8:
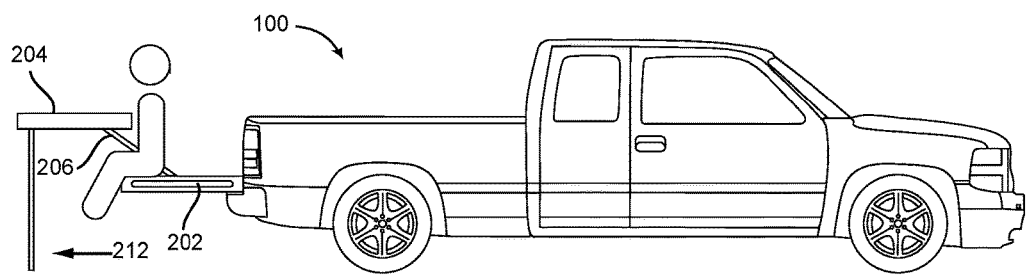
FIG. 8 illustrates a perspective view of a user sitting on a tailgate and a stabilizer bar supporting a platform, in accordance with an embodiment of the present invention.

The mount end of hinged arm 206 is configured to pivotally join with the mounting plate 202. The platform end of hinged arm 206 is configured to pivotally join with a panel 204. Hinge 208 is disposed within the middle region of hinged arm 206, between the mount end 226 and the panel end 228. Hinge 208 is configured to hingedly articulate in two directions up to 90°. For example, FIG. 7 illustrates a perspective view of a user sitting on a tailgate and pivoting apparatus 200 for use. FIG. 8 illustrates apparatus 200 horizontal and ready for use by the user.

In the operational position, hinged arm 206 may be fully extended in a linear configuration. In the stowed position, hinged arm 206 folds at the hinge, such that the mount end and the platform end join. The at least one hinge may include an aperture and a rod that separate two sections of hinged arm 206. In one embodiment, the hinged end comprises one hinge. Though in other embodiments, two or more hinges may be used.

Figure 6:
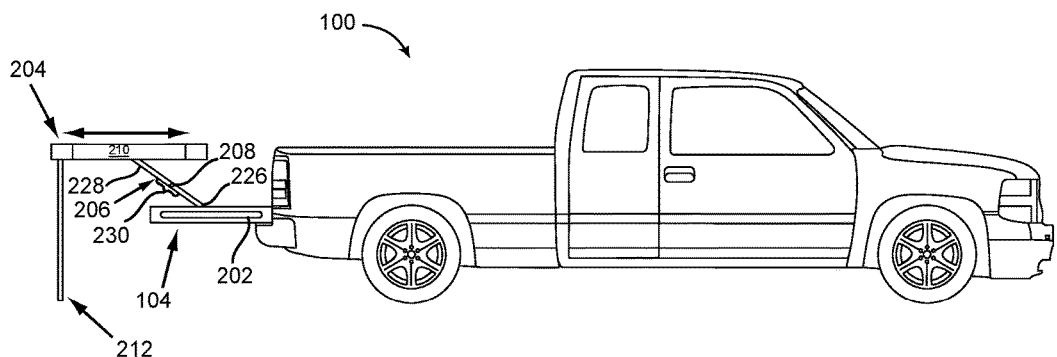
FIG. 6 illustrates a perspective view of a vehicle with a retractable tailgate table in an operational position and an exemplary stabilizer bar supporting a platform, in accordance with an embodiment of the present invention.

Looking now at FIG. 6, Apparatus 200 may further include a panel 204 that is defined by a generally flat, rigid panel having a lower surface and an upper surface. The platform end of hinged arm 206 pivotally joins at the lower surface of panel 204. A pivot mechanism may form at this junction to enable panel 204 to pivot freely about the platform end of hinged arm 206. The panel 204 is also defined by a pair of panel lateral edges 224a, 224b.

As referenced in FIG. 6, panel 204 may slide forward and rearward along a slot 210. The horizontal arrows illustrate the path taken by the panel 204. Slot 210 extends across the lower surface of panel 204. Slot 210 receives a coupling mechanism on the platform end of hinged arm 206. The coupling mechanism slides along the slot 210, such that panel 204 may be displaced laterally relative to hinged arm 206.

In this manner, a user may sit on tailgate 104 and adjust the slope of panel 204 and the distance from panel 204. The upper surface of panel 204 provides a supportive surface in the operational position. In some embodiments, the upper surface of panel 204 may be used as a working surface, an eating surface, and a seat.

As discussed above, panel 204 pivots about the platform end of the hinged arm 206 in accordance with the movement of hinged arm 206. For example, when apparatus 200 is in the operational position, panel 204 pivots to a desired slope relative to the hinged arm 206. After the desired slope is achieved, a platform lock (not shown) restricts further pivoting by the panel 204. However, when apparatus 200 is the stowed position, the panel 204 is generally coplanar and engaged with mounting plate 202.

When not in use, apparatus 200 lies flat on the open tail gate 104. For use of the apparatus 200, the panel 204 is raised upwardly, causing the hinged arm 206 to hingedly extend at the at least one hinge. Thus, the mount end and the platform end of the hinged arm 206 move away from each other about the hinge 208. A hinge lock (not shown) may restrict further hinged articulation of the hinged arm 206 at the desired point of extension. When hinged arm 206 is fully extended, the panel 204 lies horizontal relative to the hinged arm 206, ready for use. Though panel 204 may also be pivoted about the pivot mechanism to a desired slope.

In one alternative embodiment shown back in FIGS. 6 and 8, a stabilizer bar 212 extends from the lower surface of the panel 204 to a ground surface. Stabilizer bar 212 helps inhibit lateral and vertical movement by the panel 204. This is especially useful when panel 204 supports a heavy load. Stabilizer bar 212 may be mounted and hinged on the underside panel 204. Stabilizer bar 212 may telescopically extend and retract in length from this position. Stabilizer bar 212 may be separate component that detachably attaches to the tailgate 104. In one embodiment, stabilizer bar 212 is a generally rigid, linear bar.

Figure 9:
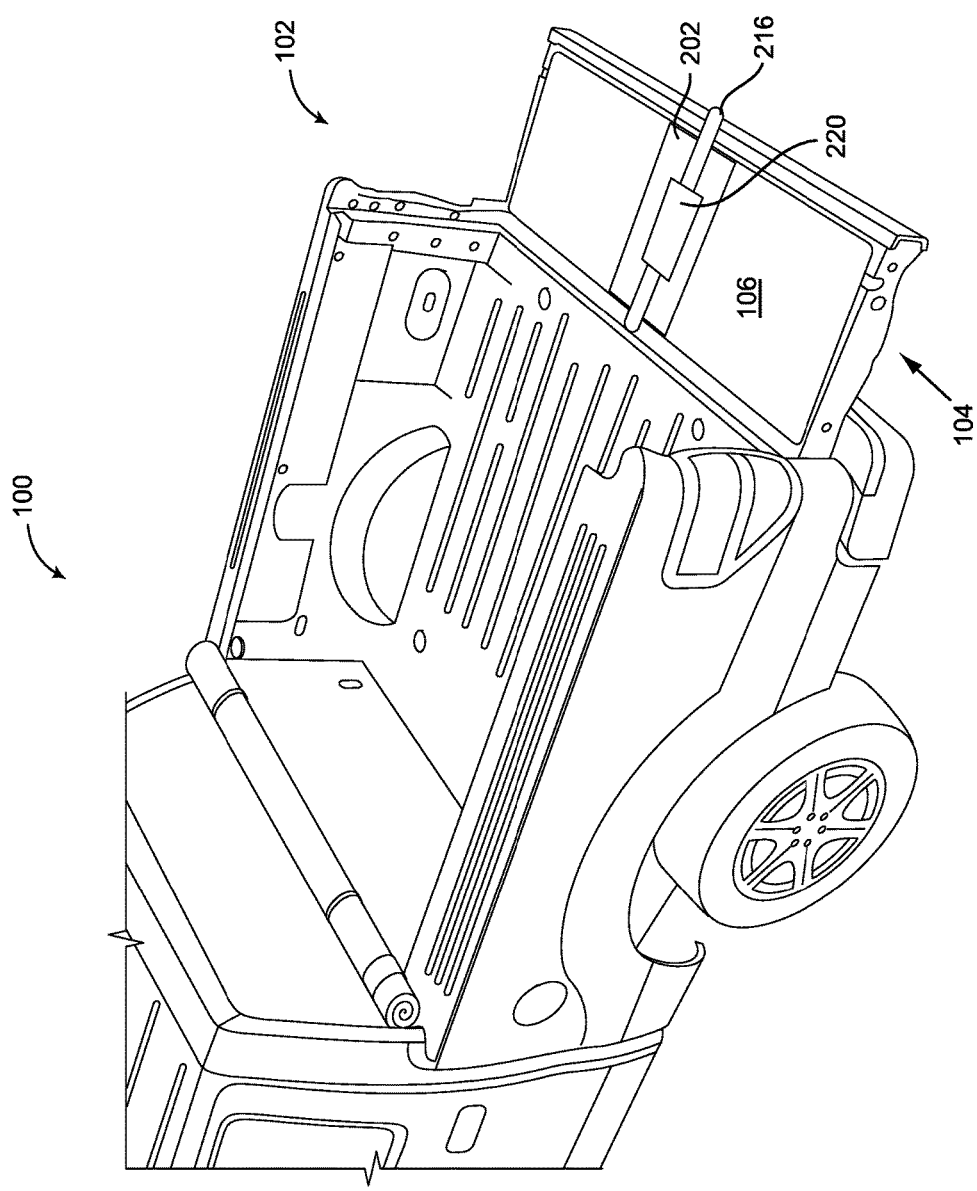
FIG. 9 illustrates a top angle perspective view of a vehicle having an exemplary mounting plate with a channel for detachable mounting to a tailgate through a strap, in accordance with an embodiment of the present invention.

Turning now to FIG. 9, mounting plate 202 not only fixedly attaches to the tailgate 104, but may detachably attach for quick removal from tailgate 104. Mounting plate 202 detachably attaches to the tailgate 104 through a channel 220 that enables a strap 216 to adjustably fasten the mounting plate 202 to the top surface 106 of tailgate 104. Strap 216 wraps around the tailgate 104 and passes through the channel 220. A ratcheting mechanism 214 may adjust the tension of strap 216.

FIG. 10 shows top view of mounting panel 204 having a channel 220. FIG. 11 illustrates a close up views of the channel 220. Channel 220 may traverse the mounting plate 202, such that strap 216 can wrap around the tailgate 104 and through the channel 220. FIG. 12 shows the strap 216 as a durable bungee type strap that can withstand excessive tensions. A ratcheting mechanism 214 may adjust the tension of strap 216. However in other embodiments, different mechanisms or methods of tying may be used to adjust the strap 216 on the tailgate 104 and mounting plate 202. Strap 216 may be removed to detach mounting plate 202 from tailgate 104.

Figure 13:
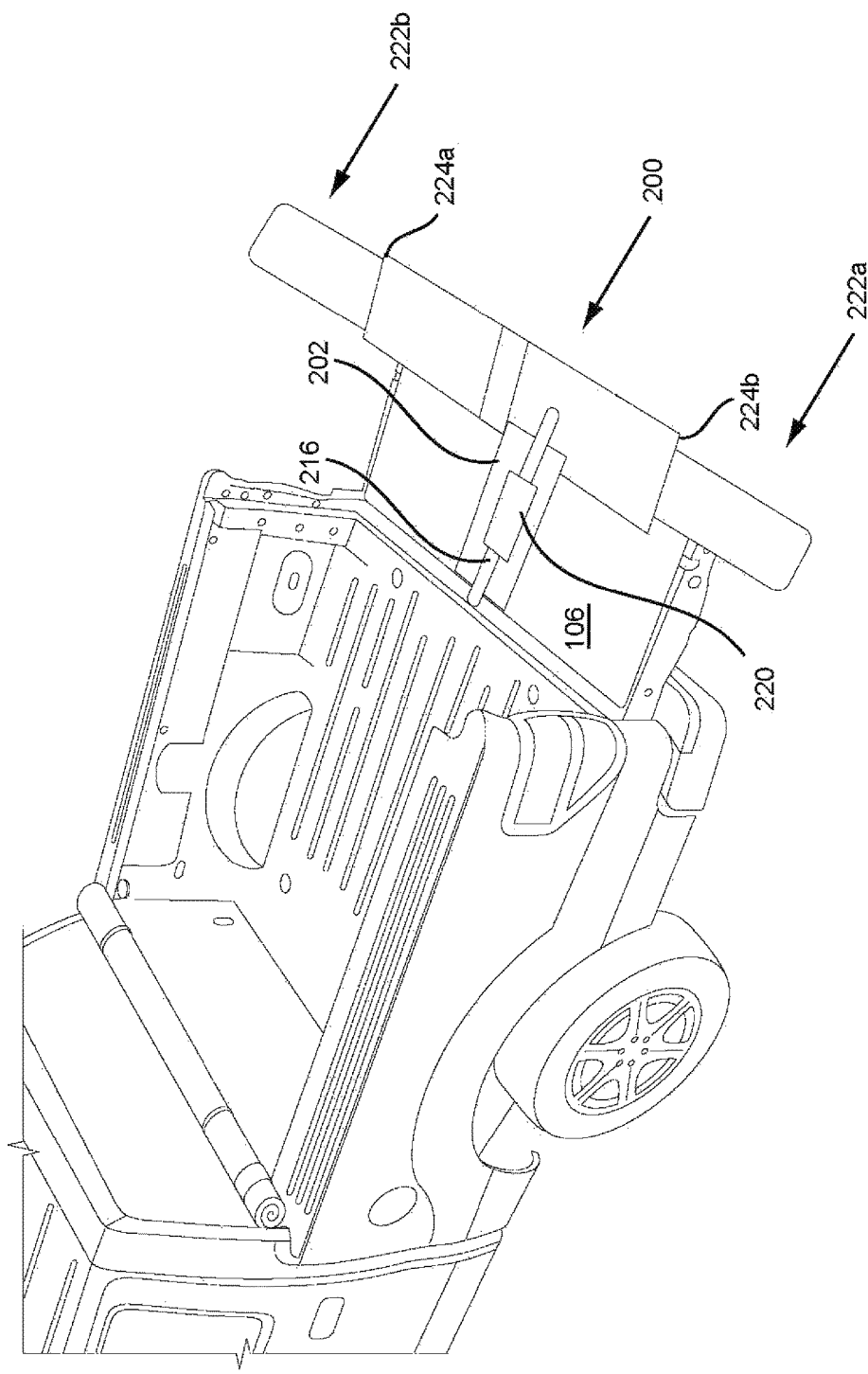
FIG. 13 illustrates a top angle perspective view of a vehicle having a platform with an exemplary extension, in accordance with an embodiment of the present invention.

In one alternative embodiment shown in FIG. 13, panel 204 comprises a pair of lateral extensions 222a, 222b configured to increase the surface area of the panel 204. Lateral extension 222a-b may laterally slide out from panel 204, or may be attached adjacent to the pair of panel lateral edges. Lateral extension 222a-b runs parallel to the ground surface, similar to panel 204. Though in other embodiments, lateral extension 222a-b may extend from the long edges of panel 204.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A tailgate retractable platform apparatus, the apparatus comprising:
    a mounting plate, the mounting plate defined by a generally flat shape, the mounting plate disposed in a generally coplanar disposition to the tailgate, the mounting plate mounted to a tailgate, wherein the mounting plate is defined by a channel;
    a hinged arm, the hinged arm comprising a mount end, a panel end, and a middle region, the mount end pivotally joined with the mounting plate;
    at least one hinge disposed at the middle region of the hinged arm, the at least one hinge operable to enable hinged articulation of the hinged arm between a stowed position and an operational position,
    whereby the hinged arm folds at the at least one hinge, such that the mount end engages the panel end in the stowed position,
    whereby the hinged arm at least partially extends about the at least one hinge to the operational position; and
    a panel, the panel defined by an upper surface and a lower surface, the lower surface of the panel pivotally joined with the panel end of the hinged arm, the panel further defined by a pair of panel lateral edges,
    whereby the panel engages the mounting plate in a coplanar disposition in the stowed position,
    whereby the panel is fixedly disposed at a slope relative to the hinged arm in the operational position.

2. The apparatus of claim 1, further comprising a stabilizer bar.

3. The apparatus of claim 2, whereby the stabilizer bar support's the panel.

4. The apparatus of claim 3, wherein the stabilizer bar is detachable from the panel.

5. The apparatus of claim 1, further comprising a pair of lateral extensions detachably attachable to the panel.

6. The apparatus of a claim 1, wherein the channel receives a strap, the strap is wrapped around the tailgate and through the channel.

7. The apparatus of claim 1, wherein the at least one hinge is a barrel hinge.

8. The apparatus of claim 1, wherein the panel is generally flat and rigid.

9. The apparatus of claim 1, wherein the panel comprises at least one extension, the at least one extension laterally extends and retracts from the lower surface of the panel.

10. A tailgate retractable platform apparatus, the apparatus comprising:
    a mounting plate, the mounting plate defined by a generally flat shape, the mounting plate disposed in a generally coplanar disposition to the tailgate, the mounting plate enables mounting to a tailgate, wherein the mounting plate is defined by a channel;
    a hinged arm, the hinged arm comprising a mount end, a panel end, and a middle region, the mount end is pivotally joined with the mounting plate;
    at least one hinge disposed at the middle region of the hinged arm, the at least one hinge operable to enable hinged articulation of the hinged arm between a stowed position and an operational position,
    whereby the hinged arm folds at the at least one hinge, such that the mount end engages the panel end in the stowed position,
    whereby the hinged arm at least partially extends about the at least one hinge to the operational position;
    a panel, the panel defined by an upper surface and a lower surface, the lower surface of the panel is pivotally joined with the panel end of the hinged arm, the panel further defined by a pair of panel lateral edges,
    whereby the panel engages the mounting plate in a coplanar disposition in the stowed position,
    whereby the panel is fixedly disposed at a slope relative to the hinged arm in the operational position; and
    a stabilizer bar support's the panel.

11. The apparatus of claim 10, wherein the stabilizer bar is detachable from the panel.

12. The apparatus of claim 10, further comprising a pair of lateral extensions detachably attachable to the pair of panel lateral edges.

13. The apparatus of claim 10, wherein the channel receives a strap, the strap wraps around the tailgate and through the channel.

14. The apparatus of claim 10, wherein the at least one hinge is a barrel hinge.

15. The apparatus of claim 10, wherein the panel comprises at least one extension.

16. The apparatus of claim 15, wherein the at least one extension laterally extends and retracts from the lower surface of the panel.

17. The apparatus of claim 1, wherein the panel is generally flat and rigid.

18. A tailgate retractable platform apparatus, the apparatus comprising of:
    a mounting plate, the mounting plate defined by a generally flat shape, the mounting plate further defined by a channel, the mounting plate disposed in a generally coplanar disposition to the tailgate, the mounting plate is mounted to a tailgate;
    a hinged arm, the hinged arm comprising a mount end, a panel end, and a middle region, the mount end is pivotally joined with the mounting plate;

at least one hinge disposed at the middle region of the hinged arm, the at least one hinge operable to enable hinged articulation of the hinged arm between a stowed position and an operational position, whereby the hinged arm folds at the at least one hinge, such that the mount end engages the panel end in the stowed position, whereby the hinged arm at least partially extends about the at least one hinge to the operational position;

a panel, the panel defined by an upper surface and a lower surface, the lower surface of the panel is pivotally joined with the panel end of the hinged arm, the panel further defined by a pair of panel lateral edges, whereby the panel engages the mounting plate in a coplanar disposition in the stowed position, whereby the panel is fixedly disposed at a slope relative to the hinged arm in the operational position;

a stabilizer bar support's the panel; and a pair of lateral extensions detachably attachable to the pair of panel lateral edges.

* * * * *